United States Patent Office 3,025,318
Patented Mar. 13, 1962

3,025,318
EXPLOSIVE MONOMERS AND POLYMERS
Robert W. Van Dolah, Pittsburgh, Pa., and Irving B. Joffe, Buffalo, N.Y., assignors to the United States of America as represented by the Secretary of the Navy
No Drawing. Filed Oct. 31, 1955, Ser. No. 544,096
11 Claims. (Cl. 260—486)
(Granted under Title 35, U.S. Code (1952), sec. 266)

The invention described herein may be manufactured and used by or for the Government of the United States of America for governmental purposes without the payment of any royalties thereon or therefor.

This invention relates to compounds having the type formula

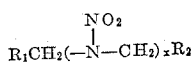

$$R_1CH_2(-\underset{|}{\overset{NO_2}{N}}-CH_2)_xR_2$$

wherein $R_1$ is hydrogen, alkenoxy or acryloxy, $R_2$ is alkenoxy or acryloxy and $x$ is an integer.

The compounds are prepared by the reaction of unsaturated alcohols, acids and salts with linear nitramines of the type formula

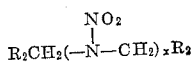

$$R_2CH_2(-\underset{|}{\overset{NO_2}{N}}-CH_2)_xR_3$$

wherein $R_1$ and $R_2$ are nitroxy and $x$ is an integer. The compounds have utility as intermediates in the preparation of polymers and co-polymers which are useful as explosives.

Compounds illustrative of the invention are prepared in accordance with the following examples.

Example I 0.0027 mole of ATX (1,7-dinitroxy-2,4,6-trinitro-2,4,6-triaza heptane) was mixed with 0.0085 mole of sodium acrylate, 10 cc. of glacial acrylic acid and 1 gram of hydroquinone. The mixture was heated with stirring at 100° C. for 20 minutes and poured into 200 cc. of water containing ice. The slurry was filtered, washed with water, methanol and ether and then recrystallized twice from acetic acid. The compound is a white solid having a melting point of 149–149.2° C. Analysis of the compound gave the following results:

|   | Calculated | Found |
|---|---|---|
| C | 31.74 | 31.78 |
| H | 3.70 | 3.27 |
| N | 22.22 | 22.22 |

The compound has the following structural formula:

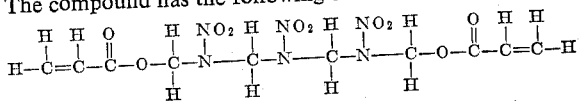

(1,7-diacryloxy-2,4,6-trinitro-2,4,6-triaza heptane)

The polymerization of the above compound is illustrated by the following example: .583 g. of the above compound and .0174 g. of benzoyl peroxide were refluxed with 10 cc. of methyl acetate for 1 hour and the polymerization product filtered out and dried. The yield of polymer was .52 gram. The product was extremely insoluble in ordinary solvents.

Example II 2 g. of NSX (1-nitroxy-2,4,6-trinitro-2,4,6-triaza heptane), 1.4 g. sodium acrylate, 15 cc. of acrylic acid and 1 g. of hydroquinone were heated with slurry at 90° C. for 10 minutes and poured into 350 cc. of water containing ice. The mixture was then filtered and washed with both methanol and ether. The compound formed is a white solid having a melting point of 143.5° C. It has the following structural formula:

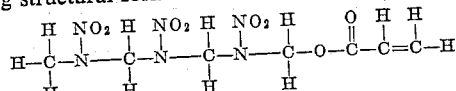

(1-acryloxy-2,4,6-trinitro-2,4,6-triaza heptane) (ATTH)

Polymerization of the above compound is illustrated by the following examples: .661 g. of the compound, .0132 g. of benzoyl peroxide and 15 cc. of methyl acetate were refluxed at 60° C. for 18 hours and the polymerization product filtered out and dried. A yield of .6 g. of polymer was obtained. The product had a softening point of 143° C., and .19 g. in 3.2 cc. of dimethyl formamide gave a viscosity of 16.28 poises at 23° C. It was found to have a heat of explosion of 705 cal./g., a specific impulse of 210–220 lb. sec./lb. (calculated), and a molecular weight of 52,000 (osmometric method). The polymer product gave the following analysis:

|   | Calculated | Found |
|---|---|---|
| C | 27.27 | 27.75 |
| H | 3.89 | 3.96 |
| N | 27.27 | 26.88 |

.4 g. of the compound, .116 g. of vinyl acetate, 10 cc. of methyl acetate and .016 g. of benzoyl peroxide were refluxed 18 hours, the product filtered out and washed with methyl acetate. A 35 percent yield of polymer was obtained. The polymer had a melting point of 135° C. Analysis of the polymer for nitrogen gave 20.79 percent calculated and 19.8 percent found. The compound was also copolymerized with methyl methacrylate and vinyl chloride.

Example III 3 g. of NSX in 25 cc. of allyl alcohol was heated at 88° C. nitrogen. An equal volume of a purifier, "Skellysolve," was added, the mixture chilled for 48 hours and filtered (hexane or other equivalent purifier may be substituted for "Skellysolve"). The compound formed was a white solid having a melting point of 69.5–70° C. It has the following structural formula:

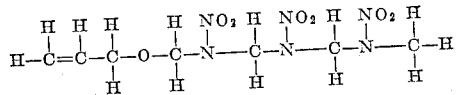

(1-allyloxy-2,4,6-trinitro-2,4,6-triaza heptane)

Copolymerization of the above compound is illustrated by the following example: .576 g. of the above compound, .115 g. of ATTH, .021 g. of benzoyl peroxide, and 15 cc. of methyl acetate were refluxed for 18 hours, the mixture poured into methanol and filtered. A yield of .20 g. of copolymer having a melting point of 93–120° C. was obtained. .4 g. of allyl ether was recovered in the process indicating that the copolymer ratio was 1 to 1.

Example IV 4 g. of ATX in 25 cc. of allyl alcohol was heated at 85° C. under nitrogen. The mixture was cooled to room temperature and filtered. The compound formed was a white solid having a melting point of 47.5° C. Analysis of the compound gave the following results:

|   | Calculated | Found |
|---|---|---|
| C | 34.30 | 34.52 |
| H | 5.13 | 5.04 |
| N | 24.00 | 24.22 |

The compound has the following structural formula:

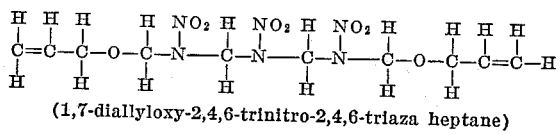

(1,7-diallyloxy-2,4,6-trinitro-2,4,6-triaza heptane)

Copolymerization of the compound is illustrated by the following example: .803 g. of the compound, .354 g. of ATTH and .034 g. of benzoyl peroxide were heated at 80° C. for 24 hours, mixed with methanol, filtered and the product dried. The copolymer had a softening point of 110° C. It is insoluble in ordinary solvents and can be molded at 100° C. and 800 lbs. pressure.

As illustrated by the above data, all of the compounds of the invention form polymers and copolymers which can be utilized as explosives and propellants.

Obviously many modifications and variations of the present invention are possible in the light of the above teachings. It is, therefore, to be understood that within the scope of the appended claims the invention may be practiced otherwise than as specifically described.

What is claimed is:

1. Compounds of the formula

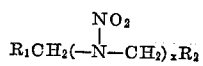

wherein $R_1$ is a member of the group consisting of hydrogen, acryloxy and lower alkenoxy; $R_2$ is a member of the group consisting of acryloxy and lower alkenoxy; and $x$ is an integer.

2. Compounds of the formula

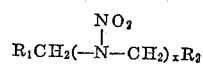

wherein $R_1$ is a member of the group consisting of hydrogen, acryloxy and lower alkenoxy; $R_2$ is a member of the group consisting of acryloxy and lower alkenoxy; and $x$ is 3.

3. The ester of the formula

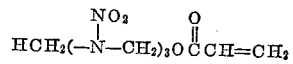

4. The ester of the formula

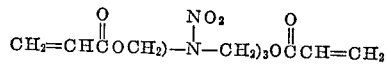

5. The ether of the formula

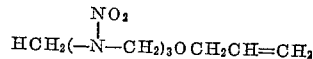

6. The ether of the formula

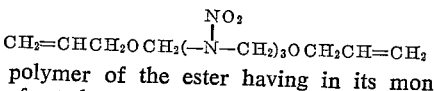

7. A polymer of the ester having in its monomeric form the formula:

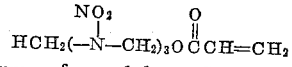

8. A copolymer formed by refluxing for 18 hours a mixture of .4 gram of 1-acryloxy-2,4,6-trinitro-2,4,6-triaza heptane, .116 gram of vinyl acetate, 10 cc. of methyl acetate and .016 gram of benzoyl peroxide.

9. A polymer of the ester having in its monomeric form the formula:

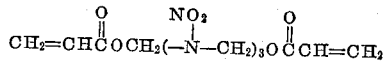

10. A copolymer formed by refluxing for 18 hours at 60° C. a mixture of .576 gram of 1-allyloxy-2,4,6-trinitro-2,4,6-triaza heptane, .115 gram of 1-acryloxy-2,4,6-trinitro-2,4,6-triaza heptane, .0132 gram of benzoyl peroxide and 15 cc. of methyl acetate.

11. A copolymer formed by heating at 80° C. for 24 hours .803 gram of 1,7-diallyloxy-2,4,6-trinitro-2,4,6-triaza heptane, .354 gram of 1-acryloxy-2,4,6-trinitro-2,4,6-triaza heptane and .034 gram of benzoyl peroxide.

References Cited in the file of this patent

FOREIGN PATENTS 615,793    Great Britain _____ Jan. 11, 1949